United States Patent [19]

Staniland

[11] Patent Number: 4,717,761

[45] Date of Patent: Jan. 5, 1988

[54] THERMOPLASTIC AROMATIC POLYETHERKETONES

[75] Inventor: Philip A. Staniland, Middlesbrough, England

[73] Assignee: Imperial Chemical Industries PLC, London, England

[21] Appl. No.: 804,847

[22] Filed: Dec. 5, 1985

[30] Foreign Application Priority Data

Dec. 5, 1984 [GB] United Kingdom ............... 8430669

[51] Int. Cl.$^4$ .................. C08G 8/02; C08G 14/00
[52] U.S. Cl. ............................ 528/125; 528/126; 528/128; 528/219
[58] Field of Search ............. 528/125, 126, 128, 219

[56] References Cited

U.S. PATENT DOCUMENTS

| | | | |
|---|---|---|---|
| 3,953,400 | 4/1976 | Dahl .................................. | 528/125 |
| 4,320,224 | 3/1982 | Rose et al. ......................... | 528/125 |
| 4,339,568 | 7/1982 | Maresca ............................. | 528/126 |

FOREIGN PATENT DOCUMENTS 0125816  11/1984  European Pat. Off. .

OTHER PUBLICATIONS

*Synthesis and Properties of Polyaryletherketones*, T. E. Atwood, P. C. Dawson, J. L. Freeman, L. R. J. Hoy, J. B. Rose and P. A. Staniland, 22 Polymer 1096, (Aug. 1981).

*Primary Examiner*—John Kight
*Assistant Examiner*—M. L. Moore
*Attorney, Agent, or Firm*—Cushman, Darby & Cushman

[57] ABSTRACT

Aromatic polyetherketones containing the repeat units:

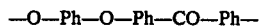

I and

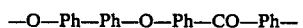

II in the relative molar proportions I:II of 95:5 to 60:40, preferably 90:10 to 60:40. The polymer typically has a melt viscosity of at least 0.06 kN.s.m.$^{-2}$ preferably at least 0.1 kN.s.m.$^{-2}$. Preferred polymers are tough. The polymers may be made by condensation of hydroquinone, 4,4'-dihydroxydiphenyl and 4,4,'-difluorobenzophenone in the presence of an alkali metal carbonate or bicarbonate and of an aromatic sulphone solvent, e.g., diphenylsulphone. Polycondensation is effected at 150°–400° C. The polymers are very useful for wire coating.

10 Claims, No Drawings

THERMOPLASTIC AROMATIC POLYETHERKETONES

This invention relates to certain thermoplastic aromatic polyetherketones and processes for the production thereof.

Aromatic polyetherketones, which have the general formula —Ar—O—, where Ar is an aromatic radical and at least some of the Ar radicals contain a ketone linkage, are generally crystalline.

Many aromatic polyetherketones have high service temperatures and are resistant to many aggressive chemical environments. However, in view of the high crystalline melting temperatures of the polymers, high processing temperatures are necessary in order to melt process the polymers. At these high temperatures the polymers are more susceptible to oxidation and other degradative processes. Polymers having the repeat structure —O—Ph—CO—Ph—, where Ph is a phenylene group, particularly a para-phenylene group, have a crystalline melting temperature in the range 365° C. to 370° C., and are processed at temperatures of at least 400° C. Polymers having the repeat structure —O—Ph—O—Ph—CO—Ph—, where Ph is as defined, have a lower crystalline melting temperature of about 335° C. and can be processed more readily than polymers of the structure —O—Ph—CO—Ph—. Polymers of the foregoing types have similar service temperatures and are generally suitable for use in applications requiring a melt processible polymer which can be used at high temperature for prolonged periods.

We have now obtained a ketone polymer having similar properties to the known materials but also having a lower crystalline melting temperature, thus allowing processing at a lower temperature.

According to the present invention we provide a polymeric material having the repeating units I and II

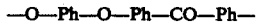   I and

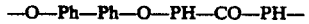   II where the repeating units I and II are in the relative molar proportions I: II of from 95:5 to 60:40, and wherein Ph is a phenylene group, preferably a para-phenylene group.

In the repeating units II, the sub-unit of structure —Ph—Ph— is a biphenylene group, particularly one in which the oxygen atoms attached thereto are in the 4,4'-positions.

The polymeric material preferably has a melt viscosity (MV) of at least 0.06 kN.s.m$^{-2}$ and more preferably of at least 0.1kN.s.m$^{-2}$. The melt viscosity (MV) is measured at 400° C. using a ram extruder fitted with a 3.175 mm×0.5 mm die operating at a shear rate of 1000s$^{-1}$. Particularly preferred polymers have an MV of at least 0.25 kN.s.m.$^{-2}$. We prefer that the MV of the polymers does not exceed 1.5 kN.s.m$^{-2}$ and especially is not more than 1.0 kN.s.m.$^{-2}$.

The polymers preferably contain units I and II in the molar proportions I:II of from 90:10 to 70:30.

The polymers of the present invention are crystalline and generally have a crystalline melting point which is below that of the homopolymer of repeating unit I or the homopolymer of repeating unit II. However, the glass transition temperature of the polymers of the invention is generally the same as, or slightly higher than, the glass transition temperature of the homopolymer of repeating unit I. More specifically polymers in accordance with the present invention have a glass transition temperature of greater than 143° C. up to 160° C. and a crystalline melting temperature of 300° C. up to 330° C. In particular, a polymer containing repeating units I and II in the relative proportions of 80:20 has a glass transition temperature of about 149° C. and a crystalline melting temperature of about 309° C.

The polymers of the present invention are generally tough. An indication of the toughness of a polymer can be obtained by flexing a film formed from the polymer. The film is obtained by compression moulding a sample of the polymer at 400° C. in a press (20 tons for 5 minutes), to give a film about 0.2 mm thick, cooling the film slowly under the applied pressure, releasing pressure at 120° C. after about 30 minutes cooling, removing the film from the press and allowing the film to further cool to room temperature. The film thus obtained is flexed through 180° C. by creasing so that the two faces of the film formed about the crease touch, the crease being compressed by finger pressure. If the film survives this treatment without breaking (e.g. snapping or tearing) it is deemed to be tough; if not it is deemed to be brittle.

As a preferred aspect of the present invention, there is provided a polymer of the units I and II in the molar proportions I:II of from 95:5 to 60:40 which has a melt viscosity measured at a temperature of 400° C. of at least 0.06 kN.s.m$^{-2}$, particularly at least 0.1 kN.s.m$^{-2}$ and which is tough as determined by the film flexing test described herein.

The polymers of the present invention have good electrical insulating properties and are suitable for use as an insulating material for example as a wire coating for use at high service temperatures.

Aromatic polyetherketones may be prepared by polycondensation of monomers containing carbonyl chloride groups in the presence of Friedel Crafts reagents but we prefer to effect the polycondensation of phenolic compounds with halo-compounds in the presence of an alkaline reagent.

More specifically, according to a further aspect of the present invention the polymers of the present invention may be obtained by the polycondensation of a mixture of at least one dihydroxybenzene compound and at least one dihydroxybiphenyl compound with at least one dihalobenzophenone. Preferably hydroquinone; 4,4'-dihydroxybiphenyl and 4,4'-difluorobenzophenone are used as the monomers. Polycondensation is preferably effected in the presence of an alkali metal carbonate or bicarbonate, or a mixture thereof. The polymerisation is preferably effected in the presence of a polymerisation solvent and since we have found that the polymerisation solvent influences the characteristics of the polymer obtained we prefer to use compounds containing an aryl sulphone grouping as the polymerisation solvent.

Thus, as yet a further aspect of the present invention the particularly preferred process for the production of a polymer of the units I and II comprises polycondensing, under substantially anhydrous conditions, a bisphenol component which is a mixture of hydroquinone and 4,4'-dihydroxybiphenyl, and a dihalide which is, or includes, 4,4'-difluorobenzophenone, there being substantially equimolar amounts of the bisphenol component and the dihalide, in the presence of at least one alkali metal carbonate or bicarbonate in an amount such that there are at least 2 gram atoms of alkali metal per mole of bisphenol component, the alkali metal or metals being selected from sodium, potassium, rubidium, and caesium, preferably excludingthe sole use of one or both of sodium carbonate and sodium bicarbonate, and in the presence of a solvent having the formula

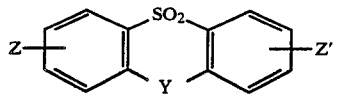

at a temperature within the range 150° to 400° C., preferably 200° to 400° C., the final temperature level during the polycondensation being sufficiently high to maintain the final polymer in solution, wherein the molar proportions of hydroquinone and 4,4'-dihydroxybiphenyl are in the range 95:5 to 60:40;

Y is a direct link, an oxygen atom or two hydrogen atoms (one attached to each benzene ring); and Z and Z', which may be the same or different, are hydrogen atoms, alkyl, alkaryl, aralkyl or aryl groups.

The polymerisation is preferably effected to give a polymer having a melt viscosity of at least 0.06 kN.s.m$^{-2}$ and more preferably of at least 0.1 kN.s.m.$^{-2}$.

In order to obtain a tough, crystalline polymer we prefer that at least 50% molar of the dihalide is 4,4'-difluorobenzophenone Replacement of up to 50% molar of the 4,4'-difluorobenzophenone by the corresponding mono - and/or di-chloro-compound, that is 4 - chloro-4'-fluorobenzophenone and/or 4,4'-dichlorobenzophenone may be effected to obtain cost advantages without an appreciable effect on the properties of the polymer obtained.

By using a mixture of the bisphenols during the polycondensation, polymerisation occurs in an essentially random manner. Alternatively, it is possible to effect the polycondensation in a sequential manner, that is using first one of the bisphenols and then the other.

The preferred polycondensation reaction is conducted in a solvent of formula

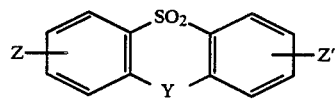

where

Y is a direct link, an oxygen atom or two hydrogen atoms (one attached to each benzene ring); and Z and Z', which may be the same or different, are preferably hydrogen atoms, methyl groups or phenyl groups. Examples of such aromatic sulphones include diphenylsulphone, ditolylsulphone dibenzothiophen dioxide, phenoxathiin dioxide and 4-phenylsulphonyl biphenyl. Diphenylsulphone is the preferred solvent.

The condensation is carried out at temperatures between 150° C. and 400° C. Initially the temperature should be kept low to avoid loss of reactants which are somewhat volatile, for example hydroquinone and 4,4'-difluorobenzophenone, and to minimise side reactions. The temperature is raised in stages or continuously to a level such that the final polymer is in solution at any intermediate stage and indeed this can serve as an indication that the full extent of the reaction has occurred at that temperature. The final temperature reached is preferably in the range from 280° C. up to 320° C.

The polycondensation is conducted using the at least one alkali metal carbonate or bicarbonate as defined. The at least one alkali metal carbonate or bicarbonate is preferably selected from sodium carbonate, sodium bicarbonate, potassium carbonate, rubidium carbonate and caesium carbonate. The at least one alkali metal carbonate or bicarbonate may be a single carbonate or bicarbonate except that it is preferred to avoid the use of only compounds of sodium. The use of sodium carbonate and/or sodium bicarbonate alone is preferably excluded because such use results in the formation of a brittle polymer of low molecular weight (M.V. less than 0.06 kN.s.m.$^{-2}$) and poor colour (for example dark grey). Mixtures of alkali metal carbonates and/or bicarbonates may advantageously be employed. In particular it may be advantageous to use a major amount of a carbonate or bicarbonate of sodium in admixture with a minor amount of a carbonate or bicarbonate of an alkali metal of higher atomic number as the polymer properties are improved in comparison to when sodium or potassium (or higher alkali metal) carbonate or bicarbonate is used alone.

Thus the use of a mixture of sodium carbonate or bicarbonate with a very small amount of a carbonate or bicarbonate of a higher alkali metal has been found to produce a tough polymer of high molecular weight (MV of at least 0.06 kN.s.m$^{-2}$ and typically of at least 0.1 kN.s.m.$^{-2}$) and good colour (white or off-white) in contrast to the polymer described above made using sodium carbonate or bicarbonate alone.

The use of a mixture of sodium carbonate or bicarbonate with a very small amount of a carbonate or bicarbonate of a higher alkali metal is also advantageous in comparison to the use of potassium (or higher alkali metal) carbonate or bicarbonate alone. Thus, while the use of potassium (or higher alkali metal) carbonate or bicarbonate alone yields a tough polymer of high molecular weight and good colour, we have found that if the polycondensation is carried out on a scale larger than a small laboratory-scale, then an undesirably high gel content (i.e. material which becomes swollen by but does not dissolve in sulphuric acid) in the polymer may sometimes be obtained and also the reaction vessel, if made of stainless steel, becomes discoloured with a dark coating which must be removed before the next polymerisation in the vessel. The use of a mixture of sodium and potassium (or higher alkali metal) carbonates or bicarbonates provides a polymer of little or no gel content and does not incur discolouration of a stainless steel reaction vessel when polycondensation is carried out on a large scale. The use of such a mixture is additionally advantageous in that sodium carbonate (or bicarbonate) is less expensive in our experience than the carbonates (or bicarbonates) of higher alkali metals and is required in a smaller amount by weight to produce an equivalent concentration of alkali metal on account of its lower molecular weight.

The amount of higher alkali metal carbonate or bicarbonate in the mixture is preferably such that there are 0.001 to 0.2, preferably 0.005 to 0.1, gram atoms of the higher alkali metal per gram atom of sodium. Particularly effective combinations include sodium carbonate or bicarbonate in admixture with potassium or caesium carbonates. Sodium carbonate in admixture with potassium carbonate is most preferred.

The total amount of alkali metal carbonate or bicarbonate employed should be such that there is at least two gram atoms of alkali metal per mole of bisphenol, that is at least one atom of alkali metal for each phenol group. An amount of less than this (even a very slight deficiency) has been found to result in a brittle polymer of poor colour, which is undesirable. Thus when using alkali metal carbonate there should be at least one mole of carbonate per mole of bisphenol and when using alkali metal bicarbonate there should be at least two moles of bicarbonate per mole of bisphenol. Too great an excess of carbonate or bicarbonate should not be used however in order to avoid deleterious side reactions: preferably there is between 1 and 1.2 atoms of alkali metal per phenol group.

The molecular weight of the polymer preferably should be such that its M.V. is at least 0.06 $kN.s.m^{-2}$, more preferably its MV is at least $0.1 kN.s.m^{-2}$ and it is particularly preferred that its M.V. is at least 0.25 $kN.s.m.^{-2}$. Polymers of M.V. lower than 0.06 $kN.s.m.^{-2}$ tend to be brittle and are not a preferred aspect of the invention. It is preferred that the polymers have M.V. of not more than 1.5 $kN.s.m.^{-2}$, preferably not more than 1.0 $kN.s.m.^{-2}$, since those polymers of higher M.V. are not generally useful as their melt viscosity is too high for adequate processability.

The molecular weight of the polymer may be controlled by the use of a slight excess over equimolar of one of the dihalide or bisphenol reactants. Preferably a slight excess, for example up to 5 mole %, of dihalide is used as this results in the favoured formation of halide end groups rather than phenate end groups thereby providing a polymer of greater thermal stability. Alternatively, the polycondensation may be terminated when the molecular weight has reached the desired level, as judged by power consumption on the agitator. A wide range of materials may be used to terminate the polycondensation, for example active mono- or di- halocompounds such as methyl chloride, 4-fluorobenzophenone or 4,4'-difluorobenzophenone.

The polyetherketones of the present invention possess excellent mechanical and electrical properties coupled with outstanding thermal and combustion characteristics. They also show resistance to an extremely wide range of solvents and proprietary fluids (they appear to dissolve only in materials such as concentrated sulphuric acid). The polymers are thus very suitable for use in applications where the service conditions are too demanding for the more established engineering plastics and in particular where the polymers are liable to high service temperatures. They may be fabricated, for example by injection moulding or by extrusion, into any desired shape, for example mouldings, coatings, films or fibres. However, in view of the high melting point of the polymers, processing at elevated temperatures is required, for example 350° C. up to 400° C.

The polymers are particularly advantageous when used as electrical insulation for electrical conductors (and in particular as insulating coatings for wires and cables) in that they exhibit high resistance to attack by solvents, particularly polar solvents such as alcohols like isopropanol, exhibit an excellent surface gloss on extrusion, and exhibit high resistance to heat stress embrittlement (embodied in the ability of electrical wire insulated by a coating of the polymer, which wire has been twisted about itself, to withstand cracking of the insulation at an elevated temperature).

Thus, as a further aspect of the present invention there is provided a fabricated structure which is a wire or cable having an insulating coating formed from the polyetherketones of the present invention.

The invention is illustrated by the following Examples.

EXAMPLE 1

4,4'-difluorobenzophenone (50.85M, 11.096 kg), hydroquinone (40M, 4.404 kg), 4.4'-dihydroxybiphenyl (10M, 1.863 kg) and diphenylsulphone (22.5 kg) were charged to a 70 $dm^3$ stainless steel reactor equipped with a stirrer, nitrogen inlet and a vent. These materials were heated with stirring to 100° C. to form a solution and, while maintaining a nitrogen blanket, anhydrous sodium carbonate (50M, 5.3 kg) and anhydrous potassium carbonate (IM, 138 g) were added (both sieved through a screen with a mesh size of 500 micrometres). Whilst continuing to stir, the temperature was raised to 175° C. and maintained there for 1 hour; the temperature was then raised to 200° C. and maintained there for 1 hour; finally the temperature was raised to 300° C. and maintained there for 2 hours, the resulting polymer being in solution at this stage. After endstopping, the mixture was cooled by casting into a sheet. The resulting solid reaction product was milled using a hammer mill, so as to pass through a screen with a mesh size of 850 micrometres. Diphenylsulphone and inorganic salts were removed by washing successively, at ambient temperature, with acetone and water.

The resulting solid polymer was dried at 140° C. in an air oven. The polymer consisted of the repeat units.

   I and

   II in the molar proportions I:II of 80:20. The polymer had a molecular weight corresponding to a melt viscosity of 0.43 $kN.s.m.^{-2}$, measured at 400° C. using a ram extruder fitted with a 3.175 mm×0.5 mm die operating at a shear rate of $1000s^{-1}$.

A film, compression moulded from the polymer at 400° C. (as described hereinbefore), was extremely tough, easily surviving the hinging toughness test described hereinbefore, and was off-white in colour. The crystalline melting point and glass transition temperature were determined using the method of differential scanning calorimetry. The results are given in the Table.

EXAMPLES 2 to 4

The procedure of Example 1 was repeated using different quantities of hydroquinone and 4,4'-dihyroxybiphenyl to give products containing the repeat units I and II in different molar proportions respectively. The polymers were found to be tough by the hinging toughness test. Further details of the properties are given in the following Table.

EXAMPLE 5

4,4'-difluorobenzophenone (22.04 g, 0.101M), hydroquinone (7.16 g, 0.065M), 4,4'-dihydroxybiphenyl (6.52 g, 0.035M) and diphenylsulphone (60 g) were charged to a 3-necked glass flask equipped with a stirrer, nitrogen inlet and an air condenser. These materials were heated with stirring to 180° C. to form a nearly colorless solution and, while maintaining a nitrogen blanket, anhydrous sodium carbonate (10.6 g, 0.100M) and anhydrous potassium carbonate (0.28 g, 0.002M), both sieved through a 500 micrometre sieve, were added. The temperature was raised to 200° C. and maintained there for 1 hour; the temperature was then raised to 250° C. and maintained there for 1 hour; finally the temperature was raised to 300° C. and maintained there for 1 hour, the resulting polymer being in solution at this stage. The polymer was then recovered and dried essentially in the manner described in Example 1. The polymer was found to be tough by the hinging toughness test. Further details of the properties are given in the following Table

TABLE

| Example or Comp Example | Molar Proportions | | Tg (a) (°C.) | Tm (b) (°C.) | MV (c) (kN·s·m$^{-2}$) |
|---|---|---|---|---|---|
| | I (%) | II (%) | | | |
| A | 100 | 0 | 143 | 334 | 0.49 |
| 4 | 95 | 5 | 146 | 328 | 0.40 |
| 2 | 90 | 10 | 146 | 322 | 0.65 |
| 3 | 85 | 15 | 148 | 315 | 0.45 |
| 1 | 80 | 20 | 149 | 309 | 0.43 |
| 5 | 65 | 35 | 156 | 313 | 0.26* |
| B | 50 | 50 | 160 | 341 | 1.2** |
| C | 0 | 100 | 167 | 416 | 0.58** |

Note to Table
(a) is the glass transition temperature
(b) is the crystalline melting temperature.
(c) MV is the melt viscosity determined as described in Example 1
*The intrinsic viscosity (IV) of the polymer was measured at 25° C. on a solution of the polymer in concentrated sulphuric acid of density 1.84 g cm$^{-3}$, said solution containing 0.1 g of polymer per 100 cm$^3$ of solution. An IV of 0.92 is equivalent to a MV of about 0.26.
**The reduced viscosity (RV) of the polymer was measured at 25° C. on a solution of the polymer in concentrated sulphuric acid of density 1.84 g cm$^{-3}$, said solution containing 1 g of polymer per 100 cm$^3$ of solution, the measurement being taken immediately after dissolution of the polymer is complete. A RV of 1.78 is equivalent to a MV of about 1.2. A RV of 1.28 is equivalent to a MV of about 0.58.

EXAMPLE 6

The general procedure of Example 1 was repeated on a larger scale in a 0.4 m$^3$ stainless steel reactor under the following conditions.

4,4'-difluorobenzophenone (61.2 kg), hydroquinone (28.766 kg), 4,4'-dihydroxybiphenyl (2.564 kg) and diphenylsulphone (124 kg) were added to the reactor and stirred for ten minutes whilst heating. Anhydrous sodium carbonate (30.25 kg) and anhydrous potassium carbonate (0.760 kg), both sieved as in Example 1, were then added at about 125° C.

The mixture was then heated, whilst continuing to stir, up to 175° C., maintained at 175° C. for two hours, heated to 200° C., maintained at 200° C. for 0.5 hour, the heated to 300° C. and maintained at 300° C. for two hours.

The polymer was then recovered and dried using the procedure as described in Example 1. The polymer had a melt viscosity of 0.07 kN.s.m.$^{-2}$. A film formed from the polymer was found to be tough by the hinging toughness test.

EXAMPLE 7

The polymer of Example 4 was extrusion compounded through a 300 mesh stainless steel filter and cut to form granules. The granules were then coated onto a 1 mm diameter silver-plated, copper wire using a 22 mm Plasticiser extruder fitted with a "tube-on" wire coating die with a total diameter of 1.5 mm. The wire was passed through the die at a rate of about 10 m/minute and the extruder was operated at a rate of about 1.0 kg/hour to give a coating of average thickness 0.25 mm. The die temperature for wire coating was about 380° C.

The coating obtained was smooth and free of electrical defects.

I claim:

1. A polymeric material having the repeating units I and II

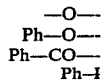

and

—O—Ph—Ph—O—Ph—CO—Ph—    II wherein the repeating units I and II are in the relative molar proportions I:II of from 95:5 to 60:40, and Ph is a phenylene group.

2. The polymeric material of claim 1 wherein each Ph group is a para-phenylene group.

3. The polymeric material of claim 2 which has a melt viscosity, measured at a temperature of 400° C., of at least kN.s.m$^{-2}$.

4. The polymeric material of claim 3 which is a tough, crystalline material and which contains the repeating units I and II in the molar proportions I:II of from 90:10 to 70:30.

5. A process for the production of a polyetherketone which process comprises polycondensing a mixture of at least one dihydroxybenzene compound and at least one dihydroxybiphenyl compound in the molar proportions of 95:5 to 60:40 with at least one dihalobenzophenone in the presence of at least one alkali metal carbonate or bicarbonate.

6. The process of claim 5 wherein a mixture of hydroquinone; 4,4-dihydroxybiphenyl and 4,4'-difluorobenzophenone is polycondensed.

7. The process of claim 6 which is effected in the presence of a solvent having the formula

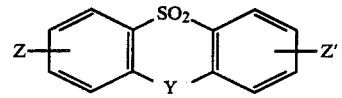

at a temperature within the range 150° to 400° C., the final temperature during the polycondensation being sufficiently high to maintain the final polymer in solution, wherein Y is a direct link, an oxygen atom or two hydrogen atoms (one attached to each benzene ring); and Z, and Z' which may be the same or different, are hydrogen atoms, alkyl, alkaryl, aralkyl or aryl groups.

8. The process of claim 5 wherein the proportions of the bisphenol components are substantially equimolar with the proportions of the at least one dihalobenzophenone.

9. The process of claim 5 wherein the sole use of one, or both, of sodium carbonate and sodium bicarbonate is excluded.

10. A fabricated structure which is a wire or cable having an insulating coating formed from a tough crystalline thermoplastic polyetherketone containing the repeating units I and II —O—Ph—O—Ph—CO—Ph—    I —O—Ph—Ph—O—Ph—CO—Ph—    II wherein the repeating units I and II are in the relative molar proportions I:II of from 95:5 to 60:40, said polymer having a melt viscosity, measured at a temperature of 400° C., of at least 0.06 kN.s.m.$^{-2}$, wherein Ph is a phenylene group.

* * * * *